Nov. 28, 1944. A. W. PRIEBE 2,363,990
METHOD OF PREPARING AND WELDING METAL PARTS
Filed Aug. 22, 1941
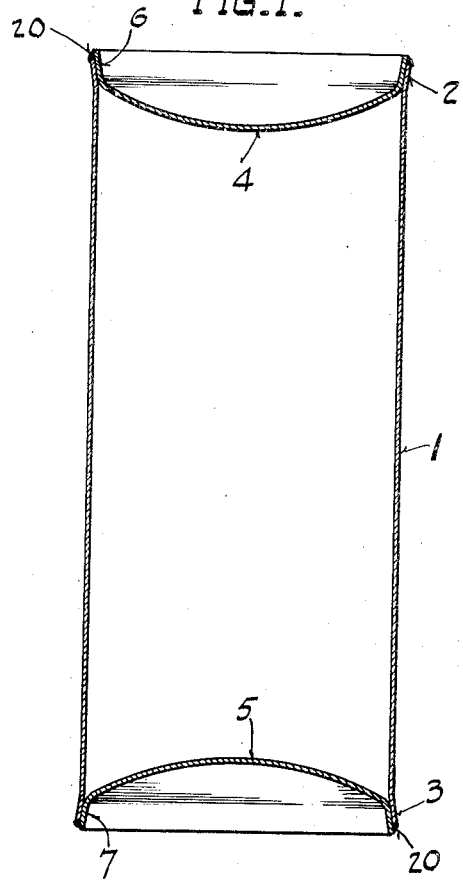
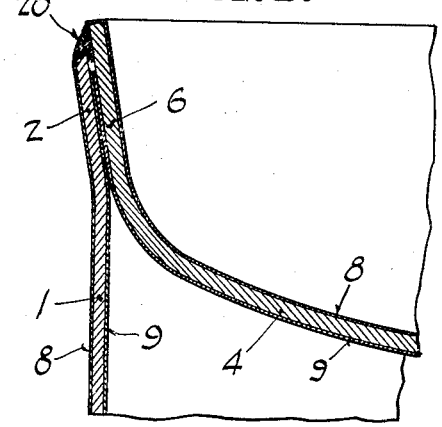
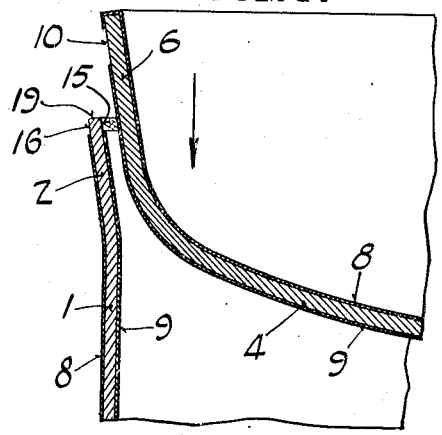
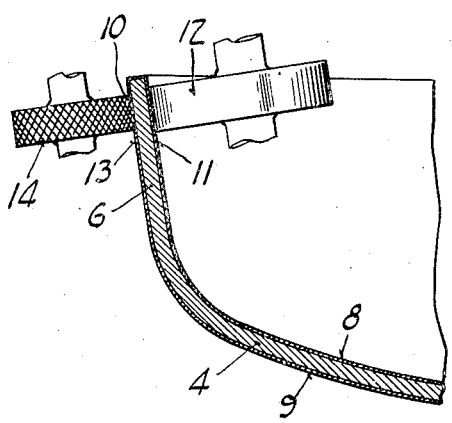
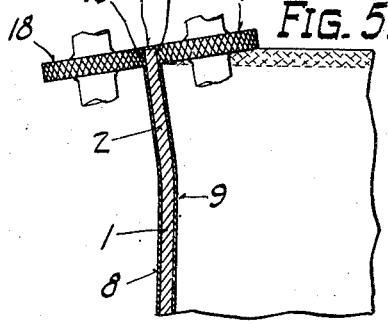
Arthur W. Priebe
INVENTOR.
BY
ATTORNEY.

Patented Nov. 28, 1944

2,363,990

UNITED STATES PATENT OFFICE 2,363,990

METHOD OF PREPARING AND WELDING METAL PARTS

Arthur W. Priebe, Milwaukee, Wis., assignor to A. O. Smith Corporation, Milwaukee, Wis., a corporation of New York Application August 22, 1941, Serial No. 407,868

7 Claims. (Cl. 29—148.2)

This invention relates to a method of preparing and welding metal parts.

One of the problems confronting manufacturers of galvanized hot water tanks arises in the welding of the head to the shells of the tanks after galavanizing the parts, as it has proven difficult to make a suitable appearing and strong weld due to the presence of the zinc.

The melting of the zinc by the heat of the welding arc produces gases or vapors that flow out of the weld as it cools off after the welding operation has been completed, causing a poor and porous weld.

In attempting to remove the zinc in the region of the weld before the welding operation is performed, grinding and sand blasting have been employed. These operations, however, are expensive and unsatisfactory as other mechanical difficulties are introduced thereby.

Attempts have also been made to remove the zinc in the region of the weld by various kinds of heating prior to the welding but poor results have been obtained, as control of the heat width is not accurate. Thus this operation produces too much irregularity in the galvanizing surrounding the weld. Since the main purpose of the galvanizing is to protect the interior of the tank from the corrosive action of the fluid contained therein it is necessary that the zinc be accurately removed and only in a certain predetermined area.

The difficulties of producing a suitable weld are largely experienced at higher speeds of welding as the welding arc itself in this type of welding does not have sufficiently opportunity to produce enough heat ahead of the actual deposit of metal to remove the zinc.

One object of the present invention is to eliminate the past difficulties encountered in the welding of galvanized parts by preparing the edges of the parts to be welded, by an accurate, quick and inexpensive method.

Other objects will become apparent from the following description of the invention as employed in the making of hot water tanks and illustrated in the accompanying drawing in which:

Figure 1 is a longitudinal section through a hot water tank;

Fig. 2 is an enlarged section through a joint between the upper head and body of the tank;

Fig. 3 is a section similar to Fig. 2 showing the head and body after being prepared for welding and in the position for assembly;

Fig. 4 is a fragmentary view of a head skirt and the operating rolls; and

Fig. 5 is a fragmentary view of a tank end and the operating rolls.

Referring to the drawing which illustrates a hot water tank, the shell 1 of generally cylindrical shape and having slightly outwardly flared end portions 2 and 3, is made of steel or other suitable metal. The heads 4 and 5, made of similar metal and having outwardly flaring skirts 6 and 7, are disposed inside the end portions 2 and 3, respectively, of the shell 1 closing the ends thereof.

Before assembly the exteriors of the shell and heads are provided with galvanizing 8 for protection against corrosion and to give a pleasing appearance to the finished tank and the interiors of these respective parts are lined with galvanizing 9 to protect the walls of the tank from corrosive action by the fluids contained therein. Suitable openings, not shown, may be provided in the tank wall for pipe connections and other fittings.

The upper and lower heads being similar in construction and attachment, only the upper head and its assembly will be described.

Before assembly of the head 4 and shell 1 of the tank a pre-determined narrow portion or band 10 of the flared skirt 6 of the head is acted upon by a set of knurling rolls.

In the operation of the knurling apparatus upon the head 4, the skirt 6 is gripped between two rolls, the inner side 11 of skirt 6 being engaged by a smooth roll 12 that does not remove the galvanizing, and the outer side 13 of the skirt 6 being engaged and worked by a knurled roll 14 that loosens the galvanizing and breaks it up into small flakes which are readily removed as by brushing.

A similar knurling operation is applied to the inside and outside surfaces of the end portion 2 of shell 1 as at 15 and 16, by the opposed knurled rolls 17 and 18, respectively. Likewise the galvanizing is broken from the end edge surface 19 of the portion 2 of shell 1 by a knurled roll, not shown. It is to be understood that more than one set of knurling rolls may be employed in each knurling operation if desired.

The knurling operations described must be accurately performed as it is desired to remove only the galvanizing that would normally be volatilized or flanked by the heat of the welding arc and dilute the weld. Also the removal is confined to the outer regions of the juncture of the head and shell to eliminate any danger of corrosive action from the fluids within the tank which may result if the protective galvanized lining is removed too far to the interior of the tank from the weld.

After the knurling action has been completed those portions of the shell and heads subjected thereto are thoroughly brushed with any suitable brushing device to remove the galvanized particles that have been broken away.

Upon assembly of the heads 2 and 3 and the shell 1 after the knurling and brushing action previously described has been performed, these respective parts are welded together by the deposit of weld metal as at 20. The weld metal covers and is fused with the exposed metal of the knurled areas and units the parts. Effective knurling to loosen the galvanizing material ordinarily marks the metal beneath the galvanizing with the imprint of the knurling device. This knurled area of the base metal provides excellent fusion conditions for weld metal such as is deposited in electric arc welding. The galvanized linings 9 of the heads and shell are in close contact and extend between the overlapped portions of the heads and shell for a considerable distance from the interior to the welded joint. This prevents free circulation of fluid in the lapped zone and thus prevents corrosion of the weld metal of the joint.

The weld metal also meets the galvanizing 8 on the exterior of the tank in a uniform manner throughout the extent of the weld to give a pleasing appearance thereto.

It will be understood that although this description and the drawing illustrate the preparation of galvanized heads and shells of hot water tanks for welding, it is not intended to limit the invention thereto as the same method may be employed in preparing other metal parts for welding.

The invention described and shown provides a weld that is free from dilution from the zinc and is well bonded to the exposed metal parts as a result of the removal of the galvanizing and, in some instances, the grooved imprint of the base metal by the knurling roll. When applied to a tank as described the galvanizing between the junctures of the heads and shell is retained to such a degree that there is no danger of the fluids within the tank acting corrosively upon the welded joint.

Further merit of the invention rests in the fact that the described method of preparing the parts for welding is more economical than prior practices as it may be more quickly and accurately performed.

I claim:

1. The method of preparing a galvanized part for welding, comprising knurling the galvanizing material at the edge to be welded to loosen the same and removing the loosened material from the part.

2. The method of preparing a galvanized part for welding, comprising knurling the galvanizing material at the edge to be welded to loosen the same, and brushing the loosened material to remove the same from the part.

3. The method of preparing a galvanized part for welding, comprising passing the edge portion of the part through a knurling apparatus in which the galvanizing material is broken by a knurling roll on one side of the part and the part is supported against the pressure of said roll by a smooth roll which does not break the galvanizing material on the other side.

4. The method of preparing the heads and shell of a hot water tank for welding together, which comprises placing the flared edge portions of said heads in a set of knurling rolls with a smooth roll on the inner side and a knurled roll on the outer side, operating the rolls on said portions to loosen the galvanizing material therefrom in a certain defined area on the outside thereof by the knurled roll and with the smooth roll passing over the galvanizing on the inner side without effecting removal thereof to provide a force to counteract the pressure of the knurling roll acting on the outside, subjecting the edges of the shell to be welded to a knurling operation to loosen the galvanizing in a defined area thereof, and brushing the loosened galvanized particles to remove the same.

5. In welding a head to the shell of a hot water tank, the steps which comprise placing the edge portions of the head between the rolls of a knurling apparatus with a smooth roll contacting the inside thereof and a knurling roll the outside thereof, operating the rolls on the edge portions to loosen the galvanizing material therefrom in a certain defined area on the outside of said edge portions by the knurling roll and with the smooth roll passing over the galvanizing on the inner side without effecting removal thereof to provide a force to counteract the pressure of the knurling roll acting on the outside, subjecting the edges of the shell to be welded to a knurling operation to loosen the galvanizing material in a defined area thereof, brushing the loosened galvanized particles to remove the same, and welding the head to the shell at the exposed areas.

6. In welding one galvanized metal part to another galvanized metal part, the steps which comprise knurling the galvanizing material at the edges of the parts to be joined by welding to loosen the coating from said parts, removing the loosening material from said edges, and welding the parts together at the exposed areas.

7. In welding one galvanized metal part to another galvanized metal part, the steps which comprise knurling the galvanizing material covering the metal parts at the edges to be joined by welding to loosen said material and provide the metal beneath the same with the imprint of the knurl, removing the loosened galvanizing material, and fusion welding the parts together at the knurled areas.

ARTHUR W. PRIEBE.

CERTIFICATE OF CORRECTION.

Patent No. 2,363,990.  November 28, 1944.

ARTHUR W. PRIEBE.

It is hereby certified that error appears in the printed specification of the above numbered patent requiring correction as follows: Page 1, first column, line 35, for the word "sufficiently" read --sufficient--; and second column, line 52, for "flanked" read --flaked--; page 2, first column, line 16, for "units" read --unites--; and second column, line 53, claim 6, for "loosening" read --loosened--; and that the said Letters Patent should be read with this correction therein that the same may conform to the record of the case in the Patent Office.

Signed and sealed this 27th day of February, A. D. 1945.

Leslie Frazer (Seal)  Acting Commissioner of Patents.